United States Patent [19]

New

[11] 4,456,391
[45] Jun. 26, 1984

[54] TILTING PAD THRUST BEARING

[75] Inventor: Nigel H. New, Harrow, England

[73] Assignee: AEPLC, Great Britain

[21] Appl. No.: 426,873

[22] Filed: Sep. 29, 1982

[30] Foreign Application Priority Data

Sep. 30, 1981 [GB] United Kingdom ................. 8129536

[51] Int. Cl.³ ............................................ F16C 17/06
[52] U.S. Cl. ..................................... 384/307; 384/308
[58] Field of Search ............... 384/307, 308, 306, 122, 384/305

[56] References Cited

U.S. PATENT DOCUMENTS

| | | | |
|---|---|---|---|
| 3,259,441 | 7/1966 | Newell | 384/308 |
| 3,454,312 | 7/1969 | Bielec | 384/307 |
| 3,814,487 | 6/1974 | Gardner | 384/307 |
| 4,403,873 | 9/1983 | Gardner | 384/308 |

*Primary Examiner*—Lenard A. Footland
*Attorney, Agent, or Firm*—Price, Heneveld, Huizenga & Cooper

[57] ABSTRACT

A tilting pad thrust bearing comprising a bearing ring, a number of spaced, circumferentially mounted thrust pads, and a series of oil nozzles located in the spaces between the pads. The pads are mounted to pivot on the ring by means of two pins arranged to fit slackly into corresponding holes in the pad.

6 Claims, 5 Drawing Figures

TILTING PAD THRUST BEARING

BACKGROUND OF THE INVENTION

The present invention relates to tilting pad thrust bearings. Such bearings generally comprise a bearing ring and a series of thrust pads distributed circumferentially about the ring, the pads being able to pivot on the ring.

In known constructions, the pads are located circumferentially by means of members positioned between the pads. In one well-known version, these members are bolts with large round heads which fit into recesses in the side of the pad on each side of the bolt.

When forced lubrication is to be employed, it is desirable to locate the lubricant distributor between the pads and it has therefore been proposed to use the locating scew itself as a lubricant nozzle, or alternatively, to position the lubricant distributor over the locating screw.

These two constructions suffer from a number of drawbacks. Firstly, such a construction renders it very difficult to locate the last pad during assembly of the ring, as the pads are placed in position, one by one. This has in some instances necessitated the use of a split screw for the last one to be located.

Secondly, replacement of worn pads has proved to be difficult, since usually, the last pad to have been placed in position must be the first to be removed, and so a number of pads may have to be removed to gain access to the worn damaged pad. Even in such a case it may be very difficult to remove the first pad.

Thirdly, the mounting of the locating screws between the pads has made the task of supplying lubricant evenly to the entire radial extent of the pad rather difficult. Since there can be a distance equal to only a fraction of the thickness of the pad for the lubricant spray to travel in order to develop the desired form, complicated distribution nozzles have had to be employed.

SUMMARY OF THE INVENTION

It is an object of the present invention to provide a tilting pad thrust bearing in which assembly and disassembly may be carried out with the minimum of difficulty and inconvenience, and in which any selected pad may be removed without the necessity to remove any other pads.

It is a further object of the invention to provide a tilting pad thrust bearing having a simple lubricant supply system offering an improved lubricant distribution.

According to the present invention, a tilting pad thrust bearing comprises a bearing ring, a number of similar thrust pads spaced apart and mounted circumferentially on the bearing ring, and a series of lubricant distributors located in the spaces between the pads, the pads being located circumferentially by means of slack-fit fixings which allow the pads to pivot on the ring, and which are located outside the spaces between the pads.

With such a construction, each pad may be located individually on its fixings without difficulty. Similarly, they may be removed individually. Also, this construction may leave the spaces between the pads free from any obstruction to the lubricant spray.

Preferably, the slack-fit fixings comprise two pins fixed to the ring adapted to extend slackly into corresponding holes formed in the pads.

With such a construction, it is not necessary to drill accurately tapped holes in the ring to receive screws, but merely to force fit split pins into a plain bore. Furthermore, it is not necessary to form large recesses in the sides of the pads but merely holes to receive the pins. Naturally, the pins may be located in the pads and be arranged to enter corresponding holes in the ring, provided that in all cases, the pins fit positively into one member and fit slackly into the other to allow the pad to be supported on and to tilt on the ring.

The pads may be of the centre-pivot or the offset pivot type depending upon whether or not they are to be used with two-way or one-way rotation. Pivoting may be achieved by a generally radial ridge formed on the rear of the pad or on the ring itself, but will be appreciated that pivoting does not take place on the pins.

Preferably, the pins associated with each pad are located at an angle to each other and lie in a plane passing through the pivotal axis of the pad. Thus, since it may require two movements to locate each pad, two movements may be required to remove the pad. This therefore helps to avoid the pads falling out of position.

The pins may also serve to locate the pads radially, though this may also be achieved by means of an outer annular flange against which the pads may bear. In such a case, each pad may be located by one pin extending radially inwards from the flange, and one pin extending axially from the ring. Alternatively, the two pins may each extend from the ring but at angle to each other.

Preferably, the lubricant distributors are nozzles which are flush with a surface of ring, the said surface being that on which the pads pivot. This may give the lubricant more space to diverge from the nozzle to produce an improved spread of lubricant. The nozzle may comprise a flat head having a delivery hole in a V-sectioned recess adapted to produce a diverging fishtail type of jet. This may be supplied with lubricant from a gallery at the rear of the ring.

These and other objects, features and advantages of the invention will become apparent from the following detailed description and drawings, in which:

DESCRIPTION OF THE PREFERRED EMBODIMENT

Figure 1:
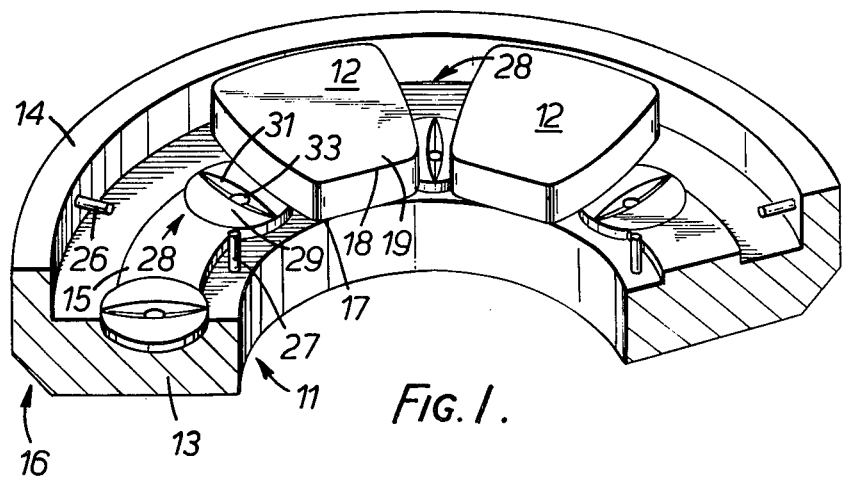
FIG. 1 is an isometric sketch of part of a thrust bearing in accordance with the invention with one pad removed.

As shown in FIG. 1, the thrust bearing comprises a bearing ring 11 and a series of thrust pads 12. In this embodiment there are eight pads 12 of which only three are shown, though, as will be appreciated, a greater or smaller number of pads 12 may be provided.

The ring 11 is generally annular in shape having a radial flange 13 and an outer axial flange 14 extending towards the front of the ring 11. On the front surface of the radial flange 13 there is a raised annular land 15. The outer rear edge of the ring 11 is chamferred as shown at 16.

Figure 2:
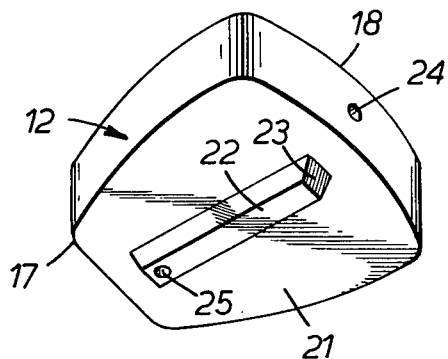
FIG. 2 is an isometric sketch from beneath of a pad for use with the ring of FIG. 1.

As shown in FIG. 2 the pads 12 are generally trapezium-shaped but have rounded corners 17 and slightly convex sides 18. The upper surface of each pad 12, which faces in the same direction as the front of the ring 11 is the bearing surface 19, the under surface 21 is formed with a raised ridge 22 which runs in a radial direction when the pad 12 is in position for most of the length of the pad 12. The ends of the ridge 22 are chamferred as shown at 23. Each pad is also formed with a pair of holes 24, 25. The first, 24 being in the radially outer end face of the pad 12 and the second, 25 being near the radially inner end of the ridge 22.

The ring 11 is provided with a pair of split pins 26, 27. The first of these 26 extends radially inwards from the axial flange 14 while the second of these 27 extends axially from the front surface of the radial flange 13. To locate a pad 12 in position, the pad 12 is pushed so that the first pin 26 enters the first hole 24 and then moved so that the second pin 27 enters the second hole 25. The holes 24, 25 are formed so that they are deeper than the pins 26, 27 are long.

The pins 26, 27 are so located that the pads 12, when in position, are spaced apart circumferentially. In addition, each pad 12 is positioned so that its axis of symmetry extends radially, and so that its ridge 22 also extends radially and rests upon the land 15. Thus, when the pad 12 tilts, it does so about the contact between the ridge 22 and the land 15. The pins 26, 27 therefore locate the pads circumferentially and limit radial movement inwards, while radial movement outwards is limited by the axial flange 14.

Figure 3:
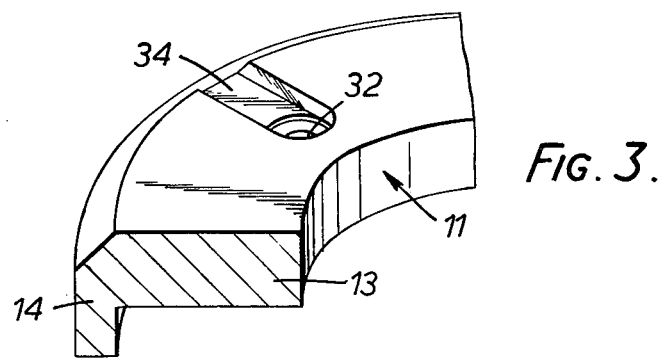
FIG. 3 is an isometric sketch of part of the ring, from the rear.

In the space between each pad 12 there is located an oil spray nozzle 28. These are in the form of a stud having a flat head 29 with a V-sectioned slit 31 and a bore 32 (FIG. 3) opening into a discharge opening 33 at the centre of the slit 31. The bore 32 is supplied with oil from a gallery (not shown) via a radial channel 34 in the rear surface of the ring 11. The flat head 29 is flush with the surface of the land 15, and the design of the nozzle 28 is such that an outwardly diverging fish-tail shaped jet of oil is formed when the bearing is in use.

Figure 4:
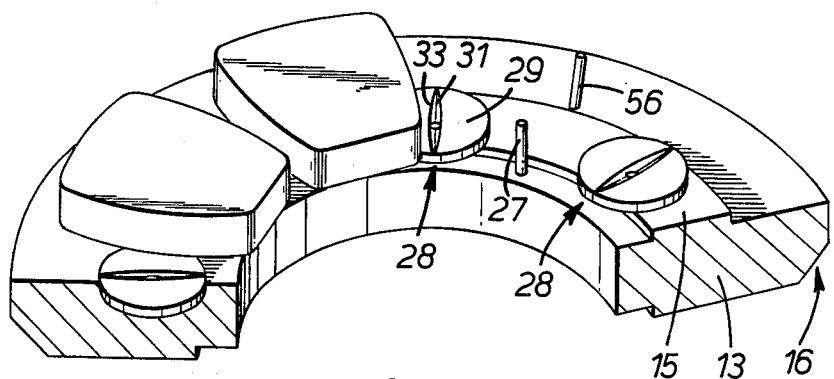
FIG. 4 is a view similar to FIG. 1 of a second embodiment.
Figure 5:
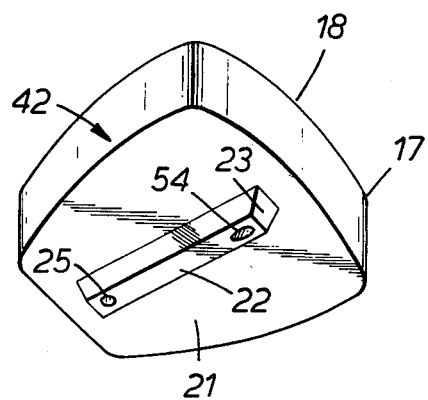
FIG. 5 is a view similar to FIG. 2 of a pad for use in the second embodiment.

In the embodiment shown in FIGS. 4 and 5, similar features are designated with similar reference numerals. In this embodiment however, the ring 41 has no outer axial flange, and the first pin, in this case 56, extends radially outwards at an angle to the front face of the ring 41. Consequently, the first hole, in this case 54, in the pad 42 is formed at the radially outer end of the ridge 22 extending into the rear face 21 of the pad 42 at a suitable angle to receive the first pin 56.

To locate the pad 42 therefore, the pad 42 is first moved so that the first pin 56 enters the first hole 54, and is then moved so that the second pin 27 enters the second hole 25. As will be seen, both circumferential and radial movement of the pads 42 are limited by the pins 27, 56 only. In other ways operation of the two embodiments is similar.

The locating pins 26, 27 and 56 in the above two embodiments have been shown as simple split pins. However, it may be preferable to replace these with threaded dowels with their threaded portions extending into tapped holes in the ring. Although such an arrangement may be more costly, it does have the advantage of easy replacement.

Another possibility is to use force-fit dowels, either alone or arranged alternately with threaded dowels.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A tilting pad thrust bearing comprising a bearing ring, a number of similar thrust pads spaced apart and mounted circumferentially on said bearing ring, a series of lubricant distributors located in the spaces between said pads, and a series of slack-fit fixings by means of which said pads are located circumferentially and which allow said pads to pivot on said ring, and which are located outside said spaces between said pads.

2. A thrust bearing according to claim 1 wherein said slack-fit fixings comprise two pins fixed to said ring and two corresponding holes formed in the pads, said pins being adapted to extend slackly into said holes.

3. A thrust bearing according to claim 2 wherein said pins associated with each pad are located at an angle to each other and lie in a plane passing through the pivotal axis of said pad.

4. A thrust bearing according to claim 3 wherein said slack-fit fixings also serve to locate said pads radially.

5. A thrust bearing according to claim 4 further including an outer annular flange on said ring, from which flange, for each said pad, one said pin extends radially inwards; and in which bearing, for each said pad, another said pin extends axially from said ring.

6. A thrust bearing according to any one of the preceding claims wherein said lubricant distributors are nozzles which are flush with a surface of said ring, said surface being that on which said pads pivot.

* * * * *